US011379128B2

(12) United States Patent
Agarwal et al.

(10) Patent No.: US 11,379,128 B2
(45) Date of Patent: Jul. 5, 2022

(54) APPLICATION-BASED STORAGE DEVICE CONFIGURATION SETTINGS

(71) Applicant: Western Digital Technologies, Inc., San Jose, CA (US)

(72) Inventors: Dinesh Kumar Agarwal, Bangalore (IN); Amit Sharma, Bangalore (IN)

(73) Assignee: Western Digital Technologies, Inc., San Jose, CA (US)

(*) Notice: Subject to any disclaimer, the term of this patent is extended or adjusted under 35 U.S.C. 154(b) by 75 days.

(21) Appl. No.: 16/915,397

(22) Filed: Jun. 29, 2020

(65) Prior Publication Data

US 2021/0405893 A1    Dec. 30, 2021

(51) Int. Cl.
*G06F 12/00*    (2006.01)
*G06F 3/06*    (2006.01)

(52) U.S. Cl.
CPC ............ *G06F 3/0629* (2013.01); *G06F 3/067* (2013.01); *G06F 3/0619* (2013.01); *G06F 3/0659* (2013.01)

(58) Field of Classification Search
CPC .... G06F 3/0629; G06F 3/0619; G06F 3/0659; G06F 3/067
USPC .......................................................... 711/154
See application file for complete search history.

(56) References Cited

U.S. PATENT DOCUMENTS

| | | | |
|---|---|---|---|
| 6,725,259 B1 | 4/2004 | Bharat | |
| 7,523,140 B2 | 4/2009 | Mosek | |
| 8,468,157 B2 | 6/2013 | Saito et al. | |
| 9,477,670 B2 | 10/2016 | Bhasin et al. | |
| 9,727,618 B2 | 8/2017 | Sharp et al. | |
| 10,606,708 B2 | 3/2020 | Banasik et al. | |
| 2005/0044487 A1 | 2/2005 | Bellegarda et al. | |
| 2007/0271224 A1 | 11/2007 | Essafi et al. | |
| 2008/0027905 A1 | 1/2008 | Jensen et al. | |
| 2009/0070325 A1 | 3/2009 | Gabriel et al. | |
| 2011/0219012 A1 | 9/2011 | Yih et al. | |
| 2012/0041955 A1 | 2/2012 | Regev et al. | |
| 2013/0262418 A1 | 10/2013 | Bhasin et al. | |
| 2014/0258283 A1 | 9/2014 | Charng et al. | |
| 2017/0017658 A1 | 1/2017 | Blong et al. | |
| 2017/0220422 A1 | 8/2017 | Butt | |
| 2018/0067957 A1 | 3/2018 | Paterson et al. | |
| 2018/0129674 A1* | 5/2018 | Kim | ..................... G06F 16/1847 |
| 2018/0373600 A1 | 12/2018 | Xu et al. | |
| 2019/0188295 A1 | 6/2019 | Sirotkovic et al. | |
| 2019/0228148 A1 | 7/2019 | Pohl et al. | |
| 2019/0251097 A1 | 8/2019 | Shmueli | |
| 2019/0347338 A1 | 11/2019 | Mani et al. | |
| 2020/0034447 A1 | 1/2020 | Lapointe et al. | |

(Continued)

OTHER PUBLICATIONS

Filipov, Philip, et al., SSD Speed Tweaks, Tweaking guide for optimizing Solid State Drive performance and reliability, speedguide.net Article, Feb. 11, 2010, (6 pages).

(Continued)

*Primary Examiner* — Mardochee Chery
(74) *Attorney, Agent, or Firm* — Patent Law Works LLP

(57) ABSTRACT

Systems, storage devices, and methods for application-based storage device configuration settings are described. A storage device may receive a storage command and dynamically select an application set of configuration settings for processing the storage command, where the configuration settings include trim parameters for writing data units to the storage medium of the storage device.

20 Claims, 8 Drawing Sheets

(56) References Cited

U.S. PATENT DOCUMENTS

2020/0167469 A1    5/2020   Kochura et al.
2021/0149564 A1*   5/2021   Luo ...................... G06F 3/0679

OTHER PUBLICATIONS

Romero-Ramirez, Alicia, et al., Automatic classification of defects in a Automatic classification of defects with the review of an appropriate feature extraction. Studies in Applied Electromagnetics and Mechanics, 2008.
Zuolo, Lorenzo, et al., Analysis of Reliability/Performance Trade-off in Solid State Drives, Conference Paper 2014 IEEE International Reliability Physics Symposium, Jun. 2014, (6 pages), doi:10.1109/irps.2014.6860646.
U.S. Appl. No. 16/249,522 filed by Tomer Eliash et al., entitled "System and Method for Storage System Property Deviation".
U.S. Appl. No. 16/713,620 filed by Laxmi Bhoopali et al., entitled "Storage System and Method for User-Defined Data Archiving".

* cited by examiner

APPLICATION-BASED STORAGE DEVICE CONFIGURATION SETTINGS

TECHNICAL FIELD

The present disclosure generally relates to data storage systems and, more particularly, to configuration settings for storage devices.

BACKGROUND

Often, distributed storage systems are used to store large amounts (e.g., terabytes, petabytes, exabytes, etc.) of data, such as objects, blocks, or files in a distributed and fault tolerant manner with a predetermined level of redundancy. These storage systems may support a variety of applications, from media servers (audio, video, images, etc.), database-driven transaction servers (banking, e-commerce, logistics, etc.), and complex hybrids, such as video games, virtual reality, autonomous vehicles, machine learning, etc.

Various applications may need different reliability and have different performance requirements for the storage devices, such as flash storage devices, used to store the application data. In many storage devices, the reliability and performance requirements are set for a specific product, such as a particular model and capacity of solid-state drive (SSD) from a particular manufacturer. The users may select the most appropriate model for their application, but may have difficulty matching device requirements dynamically for changing applications and/or different applications running on the same storage devices.

For example, a video service and banking application may have very different requirements. The video service may require very high performance and high data throughput, but has encoding and system configurations that are resilient to some amount of lost data. The banking application may require very high reliability and absolute data recoverability. However, it may be advantageous from a cost, system management, load balancing, and/or growth perspective to run both applications on a common pool of storage devices with the same or similar base specifications. One or more host systems may access application data for both applications from the same storage device or storage pool.

When managing data for multiple applications off of a common set of storage devices, it may be advantageous to allow the host to dynamically vary the reliability and performance trade-offs in how the storage device is configured. A need exists for at least storage systems that enable a host to select storage device configuration settings based on the application and corresponding reliability and performance requirements.

SUMMARY

Various aspects for storage systems using storage devices with dynamic configuration settings, particularly configuration settings that can be varied at runtime based on host application, are described.

One general aspect includes a storage device that includes a storage medium and a device controller coupled to the storage medium and configured to: receive a storage command for a target data unit; select, based on the storage command, a set of configuration settings selected from a first application set of configuration settings and a second application set of configuration settings; and execute, using the selected set of configuration settings, the storage command to the storage medium. The first application set of configuration settings includes a first trim parameter setting for electrical signals used to write data units to the storage medium, the second application set of configuration settings includes a second trim parameter setting for electrical signals used to write data units to the storage medium, and the first trim parameter setting is different from the second trim parameter setting.

Implementations may include one or more of the following features. The device controller may be further configured to: store the first application set of configuration settings, where the first application set of configuration settings corresponds to a first application type; store the second application set of configuration settings, where the second application set of configuration settings corresponds to a second application type; and determine an application type for the storage command. Selecting the first application set of configuration settings for the selected set of configuration settings may be based on the application type for the storage command matching the first application type and selecting the second application set of configuration settings for the selected set of configuration settings may be based on the application type for the storage command matching the second application type. Determining the application type for the storage command may include determining an application identifier in the storage command and determining the application type for the storage command may be based on the application identifier. The device controller may be further configured to: send the first application set of configuration settings to a host system; and receive the second application set of configuration settings from the host system, where the first application set of configuration settings are a default set of configuration settings. The device controller may be further configured to: configure a first set of storage blocks in the storage medium with the first application set of configuration settings; and configure a second set of storage blocks in the storage medium with the second application set of configuration settings, where selecting the selected set of configuration settings uses a storage location in the storage command and the storage location is selected from the first set of storage blocks and the second set of storage blocks. The set of configuration settings may include at least one error correction parameter setting for error correction algorithms used to write the target data unit to the storage medium and the storage command may include a write command for the target data unit. The first application set of configuration settings may include a first error correction parameter setting and the second application set of configuration settings may include a second error correction parameter setting, where the first error correction parameter setting is different from the second error correction parameter setting. The set of configuration settings may include at least one redundancy parameter setting for determining a number of copies of the target data unit to write to the storage medium and the storage command may include a write command for the target data unit. The first application set of configuration settings may include a first redundancy parameter setting and the second application set of configuration settings may include a second redundancy parameter setting, where the first redundancy parameter setting is different from the second redundancy parameter setting. The first application set of configuration settings may correspond to a baseline reliability value for data units stored to the storage medium and the second application set of configuration settings may correspond to a higher reliability value for data units stored to the storage medium. The first application set of configuration settings may correspond to a baseline performance value for data units stored to the storage medium and the second application set of configuration settings may correspond to a higher performance value for data units stored to the storage medium. The storage medium may be configured to include: a first set of storage blocks configured using the first application set of configuration settings; and a second set of storage blocks configured using the second application set of configuration settings. The device controller may be further configured to determine a reliability group for a plurality of data blocks corresponding to a source application and the reliability group may include storage locations in the first set of storage blocks and the second set of storage blocks.

Another general aspect includes a computer-based method that includes: storing a first application set of configuration settings, where the first application set of configuration settings includes a first trim parameter setting for electrical signals used to write data units to a storage medium; storing a second application set of configuration settings, where the second application set of configuration settings includes a second trim parameter setting for electrical signals used to write data units to the storage medium and the first trim parameter setting is different from the second trim parameter setting; receiving, at a storage device, a storage command for a target data unit; selecting, based on an application type for the storage command, a set of configuration settings selected from the first application set of configuration settings and the second application set of configuration settings; and executing, using the selected set of configuration settings, the storage command to a storage medium of the storage device.

Implementations may include one or more of the following features. The computer-based method may include determining an application type for the storage command, where: the first application set of configuration settings corresponds to a first application type; the second application set of configuration settings corresponds to a second application type; selecting the first application set of configuration settings for the selected set of configuration settings is based on the application type for the storage command matching the first application type; and selecting the second application set of configuration settings for the selected set of configuration settings is based on the application type for the storage command matching the second application type. Determining the application type for the storage command may include determining an application identifier in the storage command and determining the application type for the storage command is based on the application identifier. The computer-based method may include: sending the first application set of configuration settings to a host system, where the first application set of configuration settings are a default set of configuration settings; and receiving the second application set of configuration settings from the host system. The computer-based method may include: configuring a first set of storage blocks in the storage medium with the first application set of configuration settings; configuring a second set of storage blocks in the storage medium with the second application set of configuration settings; and using a storage location in the storage command to select the selected set of configuration settings, where the storage location is selected from the first set of storage blocks and the second set of storage blocks. The set of configuration settings may include at least one error correction parameter setting for error correction algorithms used to write the target data unit to the storage medium and the storage command may include a write command for the target data unit. The first application set of configuration settings may include a first error correction parameter setting and the second application set of configuration settings may include a second error correction parameter setting, where the first error correction parameter setting is different from the second error correction parameter setting. The set of configuration settings may include at least one redundancy parameter setting for determining a number of copies of the target data unit to write to the storage medium and the storage command may include a write command for the target data unit. The first application set of configuration settings may include a first redundancy parameter setting and the second application set of configuration settings may include a second redundancy parameter setting, where the first redundancy parameter setting is different from the second redundancy parameter setting. The first application set of configuration settings may correspond to a baseline reliability value for data units stored to the storage medium and the second application set of configuration settings may correspond to a higher reliability value for data units stored to the storage medium. The first application set of configuration settings may correspond to a baseline performance value for data units stored to the storage medium and the second application set of configuration settings may correspond to a higher performance value for data units stored to the storage medium.

Still another general aspect includes a system that includes: a storage device including a storage medium and a device controller coupled to the storage medium; means for storing a first application set of configuration settings, where the first application set of configuration settings includes a first trim parameter setting for electrical signals used to write data units to the storage medium; means for storing a second application set of configuration settings, where the second application set of configuration settings includes a second trim parameter setting for electrical signals used to write data units to the storage medium and the first trim parameter setting is different from the second trim parameter setting; means for receiving, at the storage device, a storage command for a target data unit; means for selecting, based on an application type for the storage command, a set of configuration settings selected from the first application set of configuration settings and the second application set of configuration settings; and means for executing, using the selected set of configuration settings, the storage command to the storage medium of the storage device.

The various embodiments advantageously apply the teachings of storage networks and/or systems supporting host applications to improve the functionality of such computer systems. The various embodiments include operations to overcome or at least reduce the issues previously encountered on the storage networks and/or systems and, accordingly, are more reliable and/or efficient than other computing networks. That is, the various embodiments disclosed herein include hardware and/or software with functionality to improve the storage of application data for heterogeneous host applications on a storage device, such as by varying storage device configuration settings at runtime based on the particular host application storing or retrieving the application data. Accordingly, the embodiments disclosed herein provide various improvements to storage networks and/or storage systems.

It should be understood that language used in the present disclosure has been principally selected for readability and instructional purposes, and not to limit the scope of the subject matter disclosed herein.

DETAILED DESCRIPTION

Figure 1:
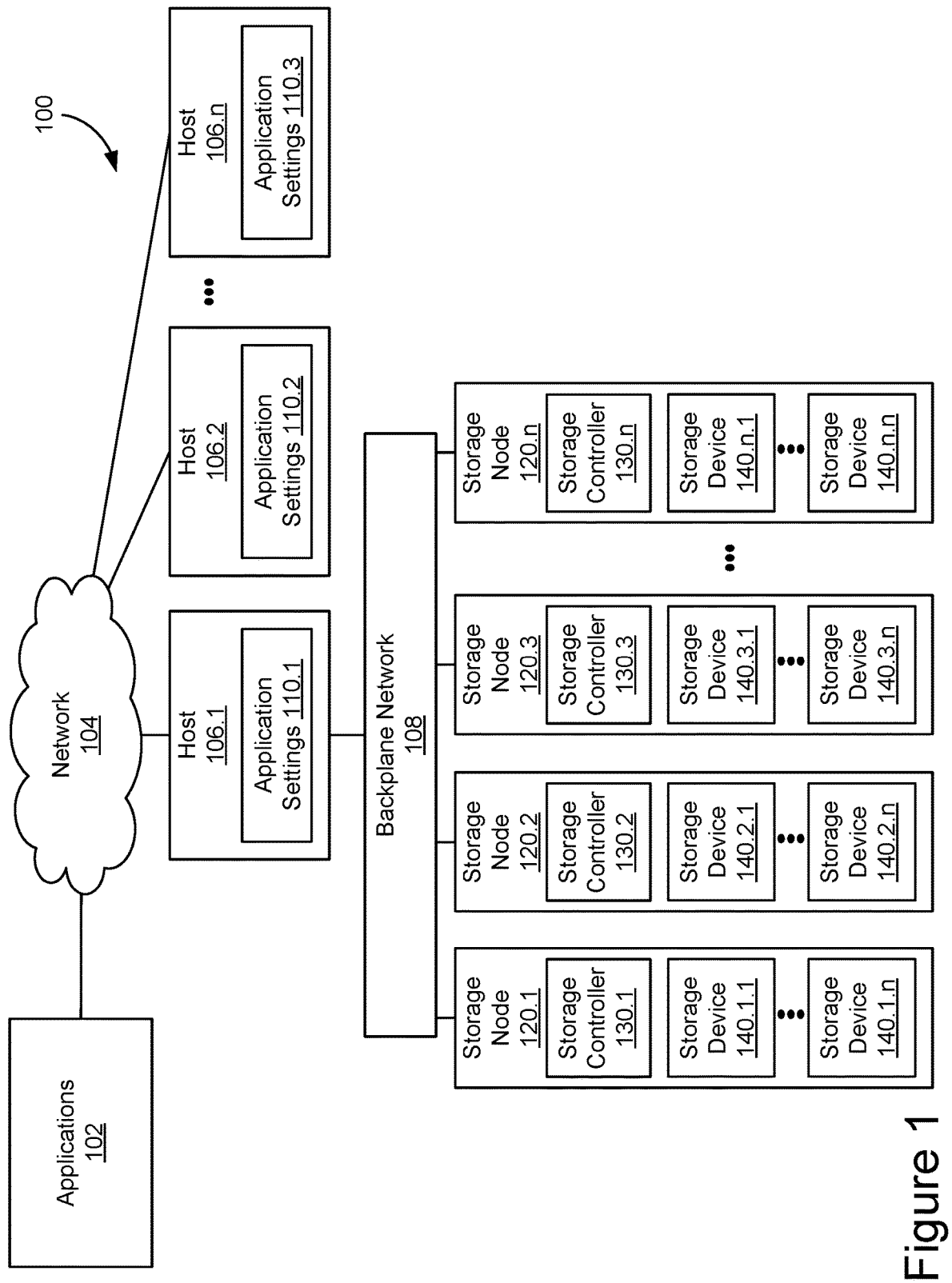
FIG. 1 schematically illustrates a storage system.

FIG. 1 shows an embodiment of an example data storage system 100 with distributed processing capabilities. While some example features are illustrated, various other features have not been illustrated for the sake of brevity and so as not to obscure pertinent aspects of the example embodiments disclosed herein. To that end, as a non-limiting example, data storage system 100 includes one or more data storage devices 140 (also sometimes called information storage devices, storage devices, or disk drives) configured in storage nodes 120. In some embodiments, storage nodes 120 may be configured as blades, rack servers, storage arrays, or similar storage units for use in data center storage racks or chassis. Storage nodes 120 may support one or more applications 102 and provide data storage and retrieval capabilities for host systems 106. In some embodiments, storage nodes 120 may be configured in a distributed storage hierarchy that supports hosts 106. Each host 106 may be connected to a corresponding set of storage nodes and storage devices, though only storage nodes 120 and storage devices 140 for controller 106.1 are shown.

In the embodiment shown, each storage node 120 includes a number of storage devices 140 attached to a backplane network 108. For example, storage devices 140 may include a number of disk drives arranged in a storage array, such as storage devices sharing a common rack, unit, or chassis in a data center. In some embodiments, storage devices 140 may share backplane network 108, network switch(es), and/or other hardware and software components for connecting to host 106.1 over an isolated network that does not use the general network and interface bandwidth of host 106.1. For example, backplane network 108 may include a plurality of physical port connections to storage nodes 120, storage controllers 130, and/or storage devices 140 that define physical, transport, and other logical channels for establishing communication with the different components and subcomponents thereof. In some embodiments, the interconnections among host 106.1, storage nodes 120, storage controllers 130, and/or storage devices 140 may be configured as an interconnect fabric supported by a fabric interconnect protocol, such as non-volatile memory express over fabric (NVMe-oF). In some embodiments, backplane network 108 may provide a plurality of physical connections to storage nodes 120 via storage controllers 130 that enable host 106.1 to access storage nodes 120 via a backplane network 108 and storage controllers 130. These physical connections may include one or more Ethernet connections, peripheral computer interface express (PCIe), fibre channel (FC), serial attached small computer storage interface (SAS), etc., as well as combinations thereof, and backplane network 108 may include a secure subnetwork through various network switches, network interfaces, and similar networking components.

Applications 102 may be configured as software applications or modules in an information technology (IT) system for accessing storage system 100 to store, read, or otherwise access, use, or manage data therein through one or more hosts 106. In some embodiments, applications 102 may run on one or more computing system, such as a general-purpose computer configured as an application server, a personal computer, a laptop, a tablet, a wireless telephone, a personal digital assistant or any other type of communication device that is able to interface with the storage system 100 and/or hosts 106. In some embodiments, applications 102 may include one or more user applications, such as computer-based media, financial, e-commerce, productivity, or business services, through a network-enabled computing device interacting with an internet-based application server supported by storage system 100 for application data management.

In some embodiments, hosts 106 may be configured to support a plurality of applications 102 with different storage reliability and performance requirements. Hosts 106 may include application settings 110 that include storage device configuration settings for storage devices 140. Application settings 110 may enable hosts 106 to dynamically configured storage device configuration settings at runtime to support different applications 102. In some embodiments, application settings 110.1 may include a plurality of application sets of storage device configuration settings, where each application set corresponds to a selected application or application type in applications 102. For example, application settings 110 may include an application set of storage device configuration settings for financial or transactional applications and another application set of storage device configurations for video or media applications. In some embodiments, application settings 110 may include a graphical user interface for configuring and storing application sets of storage device configuration settings and providing those sets of storage device configuration settings to storage devices 140. In some embodiments, an application identifier and/or application type may be associated with each set of storage device configuration settings and the application identifier or application type may be included in storage commands from hosts 106 to storage devices 140 and indicate the set of storage device configuration settings to be used for executing the storage command.

Several storage nodes 120 can be grouped together with an associated host 106, such as storage nodes 120.1-120.n sharing a backplane connection through backplane network 108 with host 106.1. For example, these components may be housed in a single rack or chassis with associated backplane interfaces. Similarly, each host 106.2-106.n may be associated with another rack or chassis and another set of storage nodes. These racks may not be required to be located at the same location. They may be geographically dispersed across different data centers. For example, host 106.1 and associated storage nodes 120.1-120.n may be located in a rack at a data center in Europe, host 106.2 and associated storage nodes may be located in a rack at a data center in the USA, and host 106.*n* and associated storage nodes may be located in a rack at a data center in China. Similarly, these racks may be interconnected by a variety of network architectures and may include multiple network paths, global networks (e.g., internet), private networks, virtual networks, subnetworks, etc. and related networking equipment. These distributed rack components may be interconnected to network 104.

In some embodiments, the data storage devices 140 are, or include, solid-state drives (SSDs). Each data storage device 140.1.1-140.*n.n* may include a non-volatile memory (NVM) or device controller based on compute resources (processor and memory) and a plurality of NVM or media devices for data storage (e.g., one or more NVM device(s), such as one or more flash memory devices). In some embodiments, a respective data storage device 140 of the one or more data storage devices includes one or more NVM controllers, such as flash controllers or channel controllers (e.g., for storage devices having NVM devices in multiple memory channels). In some embodiments, data storage devices 140 may each be packaged in a housing, such as a multi-part sealed housing with a defined form factor and ports and/or connectors for interconnecting with backplane network 108.

In some embodiments, a respective data storage device 140 may include a single medium device while in other embodiments the respective data storage device 140 includes a plurality of media devices. In some embodiments, media devices include NAND-type flash memory or NOR-type flash memory. In some embodiments, data storage device 140 includes one or more hard disk drives (HDDs). In some embodiments, data storage devices 140 may include a flash memory device, which in turn includes one or more flash memory die, one or more flash memory packages, one or more flash memory channels or the like. However, in some embodiments, one or more of the data storage devices 140 may have other types of non-volatile data storage media (e.g., phase-change random access memory (PCRAM), resistive random access memory (ReRAM), spin-transfer torque random access memory (STT-RAM), magneto-resistive random access memory (MRAM), etc.).

In some embodiments, storage controllers 130 may be coupled to respective data storage devices 140 through an interface bus within each storage node 120. For example, each storage mode may be configured as a storage blade or similar storage unit comprising a plurality of interface slots for storage devices 140. Storage controllers 130 may include NVMe interface cards with interface ports for NVMe compatible storage devices, such as storage devices with NVMe interfaces and onboard remote direct memory access (RDMA) engines. In some embodiments, storage controllers 130 may be coupled to respective data storage devices 140 through backplane network 108. However, in some embodiments, storage controllers 130 may be hosted as a component and/or a subsystem of another component of data storage system 100. For example, in some embodiments, some or all of the functionality of storage controllers 130 may be implemented by hardware and software for defining a protocol-based storage interface executed on one or more compute resources in at least one of data storage devices 140, backplane network 108, and/or physical interfaces or networking components thereof. Storage controllers 130 are sometimes called a controller system, a main controller system, a non-volatile memory express (NVMe) controller, garbage collection (GC) leader, or storage virtualization controller (SVC). In some embodiments, storage nodes 120 may include redundant storage controllers 130, such as a master controller and a secondary controller, for accessing the same set of storage devices 140.

In some embodiments, network 104 may include a wired and/or wireless network (e.g., public and/or private computer networks in any number and/or configuration) which may be coupled in a suitable way for transferring data. For example, network 104 may include any means of a conventional data communication network such as a local area network (LAN), a wide area network (WAN), a telephone network, such as the public switched telephone network (PSTN), an intranet, the internet, or any other suitable communication network or combination of communication networks. Data can be transferred between application 102 and hosts 106 and/or storage nodes 120, storage controllers 130, and storage devices 140 by means of a variety of network protocols, including transmission control protocol (TCP), remote direct memory access (RDMA), RDMA over converged Ethernet (RoCE), NVMe over fabric (NVMe-oF), hypertext transfer protocol (HTTP)/representational state transfer (REST) object interfaces, language-specific interfaces such as Microsoft .Net, Python or C, etc. Additionally, such hosts 106 may comprise additional high bandwidth Ethernet ports to interface with the storage nodes 130. In some embodiments, HTTP/REST protocols complying with S3 may enable data transfer through a REST application protocol interfaces (API). Preferably, hosts 106 may operate as a highly available cluster of host nodes, and provide, for example, shared access to and processing of the data in storage nodes 130.

Host systems 106 may be any suitable computer device, such as a computer, a computer server, a laptop computer, a tablet device, a netbook, an internet kiosk, a personal digital assistant, a mobile phone, a smart phone, a gaming device, or any other computing device with sufficient processing capabilities to execute compute tasks for the distributed function requests. Hosts 106 are sometimes called a host system, client, or client system. In some embodiments, hosts 106 are each a high-performance server system, such as a server system in a data center. In some embodiments, hosts 106 are configured in one or more host devices distinct from storage nodes 120, storage controllers 130, and the plurality of storage devices 140. The one or more hosts 106 may be configured to store and access data in the plurality of storage devices 140 through storage controllers 130.

In some embodiments, data storage system 100 includes one or more processors, one or more types of memory, a display and/or other user interface components such as a keyboard, a touch screen display, a mouse, a track-pad, and/or any number of supplemental devices to add functionality. In some embodiments, data storage system 100 does not have a display and other user interface components.

In some embodiments, backplane network 108 may include or employ one or more interfaces, routers, and physical connections to each component or subcomponent physically and logically connected to backplane network 108. In some embodiments, backplane network 108 may include a fabric network defined in terms of fabric nodes communicating with one another through backplane network 108 using a fabric network protocol, such as NVMe-oF. In some embodiments, fabric nodes may be organized as system nodes and subsystem nodes, where subsystem nodes include addressable storage resources and system nodes include subsystem management resources. Fabric network protocols may support a data connection to each subsystem fabric node, but typically conveys commands in addition to data, and optionally conveys metadata, error correction information and/or other information in addition to data values to be stored in storage devices 140 and data values read from storage devices 140.

In some embodiments, each storage device 140 includes a device controller, which includes one or more processing units (also sometimes called CPUs or processors or microprocessors or microcontrollers) configured to execute instructions in one or more programs. In some embodiments, the one or more processors are shared by one or more components within, and in some cases, beyond the function of the device controllers. Media devices are coupled to the device controllers through connections that typically convey commands in addition to data, and optionally convey metadata, error correction information and/or other information in addition to data values to be stored in media devices and data values read from media devices. Media devices may include any number (i.e., one or more) of memory devices including, without limitation, non-volatile semiconductor memory devices, such as flash memory device(s).

In some embodiments, media devices in storage devices 140 are divided into a number of addressable and individually selectable blocks, sometimes called erase blocks. In some embodiments, individually selectable blocks are the minimum size erasable units in a flash memory device. In other words, each block contains the minimum number of memory cells that can be erased simultaneously (i.e., in a single erase operation). Each block is usually further divided into a plurality of pages and/or word lines, where each page or word line is typically an instance of the smallest individually accessible (readable) portion in a block. In some embodiments (e.g., using some types of flash memory), the smallest individually accessible unit of a data set, however, is a sector or codeword, which is a subunit of a page. That is, a block includes a plurality of pages, each page contains a plurality of sectors or codewords, and each sector or codeword is the minimum unit of data for reading data from the flash memory device.

A data unit may describe any size allocation of data, such as host block, data object, sector, page, multi-plane page, erase/programming block, media device/package, etc. Storage locations may include physical and/or logical locations on storage devices 140 and may be described and/or allocated at different levels of granularity depending on the storage medium, storage device/system configuration, and/or context. For example, storage locations may be allocated at a host logical block address (LBA) data unit size and addressability for host read/write purposes but managed as pages with storage device addressing managed in the media flash translation layer (FTL) in other contexts. Media segments may include physical storage locations on media devices 140, which may also correspond to one or more logical storage locations. In some embodiments, media segments may include a continuous series of physical storage location, such as adjacent data units on a storage medium, and, for flash memory devices, may correspond to one or more media erase or programming blocks. A logical data group may include a plurality of logical data units that may be grouped on a logical basis, regardless of storage location, such as data objects, files, or other logical data constructs composed of multiple host blocks.

Figure 2:
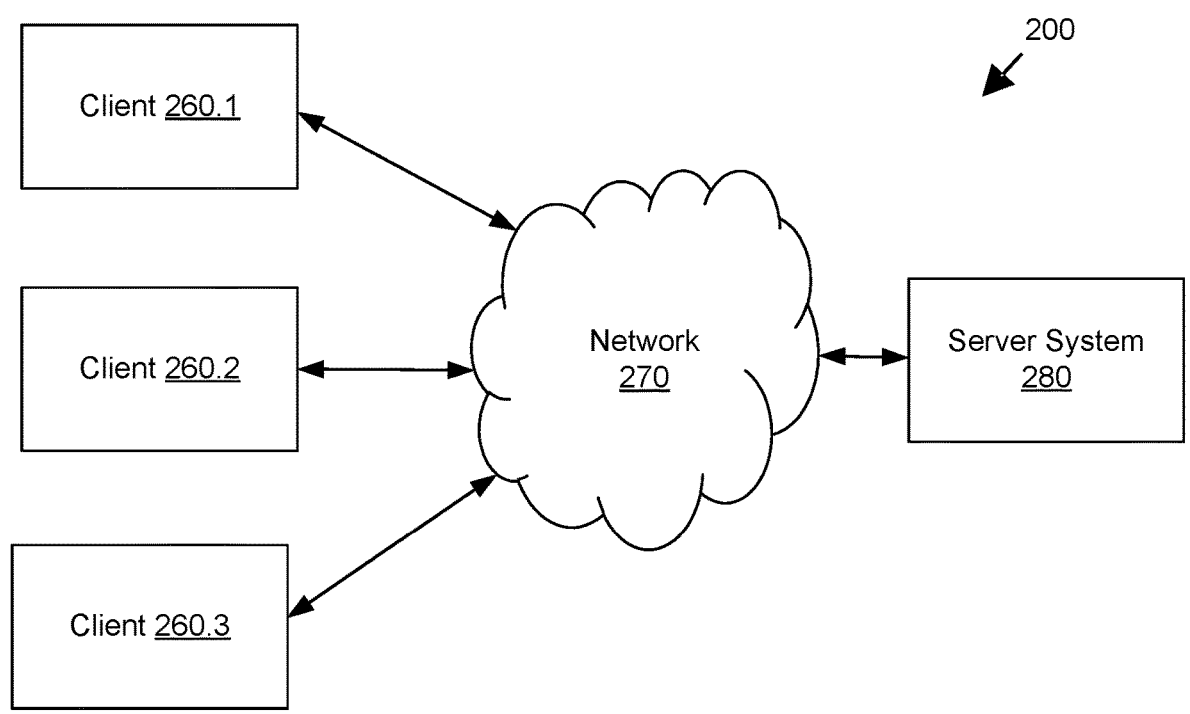
FIG. 2 schematically illustrates a client-server architecture for client applications that may be used by the system of FIG. 1.

FIG. 2 is a block diagram of an example storage network 200 using a client architecture. In some embodiments, storage system 100 may be embodied in such a storage network 200. As shown, storage network 200 can include multiple client devices 260 capable of being coupled to and in communication with a storage network 200 via a wired and/or wireless network 270 (e.g., public and/or private computer networks in any number and/or configuration (e.g., the Internet, an intranet, a cloud network, etc.)), among other examples that may include one client device 260.1 or two or more client devices 260 (e.g., is not limited to three client devices 260.1-260.3).

A client device 260 can be any computing hardware and/or software (e.g., a thick client, a thin client, or hybrid thereof) capable of accessing server system 280 utilizing network 270. Each client device 260, as part of its respective operation, relies on sending input/output (I/O) requests to server system 280 to write data, read data, and/or modify data. Specifically, each client device 260 can transmit I/O requests or storage commands to read, write, store, communicate, propagate, and/or transport instructions, data, computer programs, software, code, routines, etc., to server system 280. Client device(s) 260 and server system 280 may comprise at least a portion of a client-server model. In general, server system 280 can be accessed by client device(s) 260 and/or communication with server system 280 can be initiated by client device(s) 260 through a network socket (not shown) utilizing one or more inter-process networking techniques. In some embodiments, client devices 260 may access one or more applications to use or manage a storage system, such as storage system 100 in FIG. 1.

Figure 3:
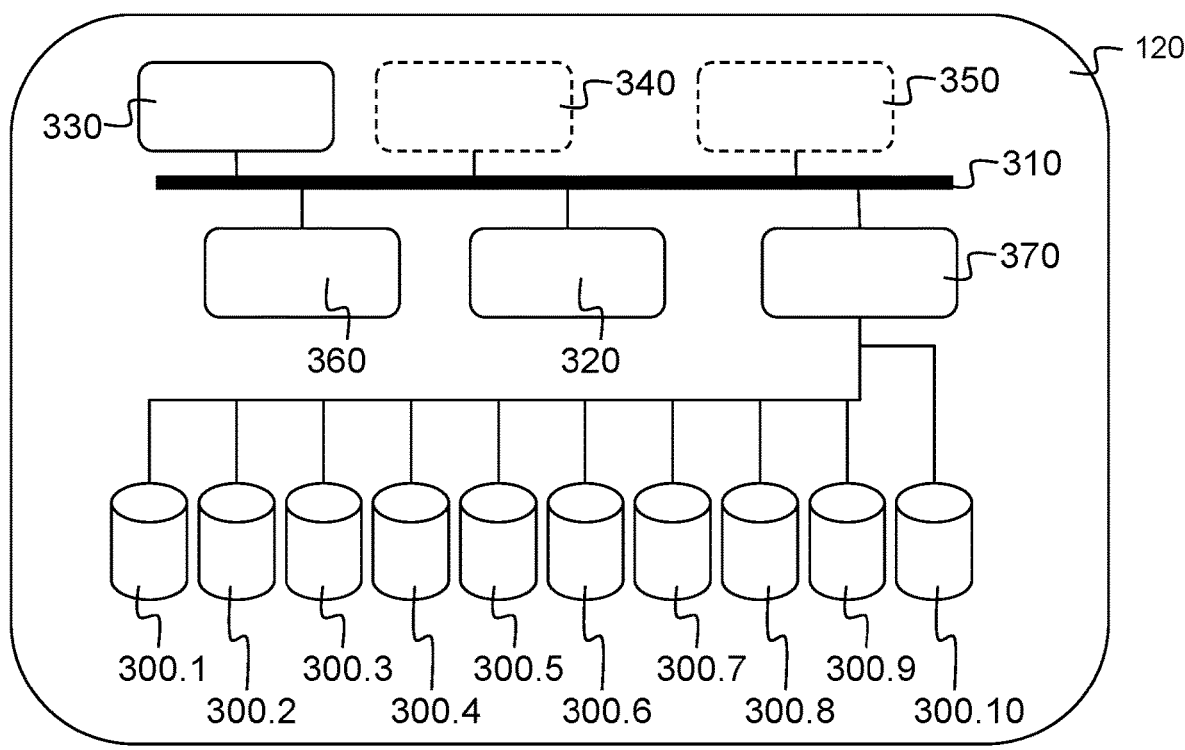
FIG. 3 schematically illustrates a storage node of the system of FIG. 1.

FIG. 3 shows a schematic representation of one of the storage nodes 120. Storage node 120 may comprise a bus 310, a processor 320, a local memory 330, one or more optional input units 340, one or more optional output units 350, a communication interface 360, a storage element interface 370 and a plurality of storage elements 300.1-300.10. In some embodiments, at least portions of bus 310, processor 320, local memory 330, communication interface 360, storage element interface 370 may comprise a storage controller or backplane management controller, such as storage controllers 130. Bus 310 may include one or more conductors that permit communication among the components of storage node 120. Processor 320 may include any type of conventional processor or microprocessor that interprets and executes instructions. Local memory 330 may include a random-access memory (RAM) or another type of dynamic storage device that stores information and instructions for execution by processor 320 and/or a read only memory (ROM) or another type of static storage device that stores static information and instructions for use by processor 320. Input unit 340 may include one or more conventional mechanisms that permit an operator to input information to said storage node 120, such as a keyboard, a mouse, a pen, voice recognition and/or biometric mechanisms, etc. Output unit 350 may include one or more conventional mechanisms that output information to the operator, such as a display, a printer, a speaker, etc. Communication interface 360 may include any transceiver-like mechanism that enables storage node 120 to communicate with other devices and/or systems, for example mechanisms for communicating with other storage nodes 120 or host nodes 106 such as for example two 1 gigabit (Gb) Ethernet interfaces. Storage element interface 370 may comprise a storage interface, such as a Serial Advanced Technology Attachment (SATA) interface, a Small Computer System Interface (SCSI), peripheral computer interface express (PCIe), etc., for connecting bus 310 to one or more storage elements 300, such as one or more storage devices 140, for example, 2 terabyte (TB) SATA-II disk drives or 2 TB NVMe solid state drives (SSDs), and control the reading and writing of data to/from these storage elements 300. As shown in FIG. 3, such a storage node 120 could comprise ten 2 TB SATA-II disk drives as storage elements 300.1-300.10 and in this way storage node 120 would provide a storage capacity of 20 TB to the storage system 100.

The storage system 100 may comprises a plurality of storage elements 300. The storage nodes 120 each comprise a share of these storage elements 300. Each storage nodes 120 could comprise a similar amount of storage elements, but this is, however, not essential. Storage node 120 could for example comprise four, eight, ten, or any other number of storage elements appropriate to interface and form factor constraints. The storage system 100 may be operable to store and retrieve a data objects, data blocks, data files, or other data units comprising data, for example, 64 MB of binary data and a location or object identifier for addressing this data unit, for example a universally unique identifier such as a globally unique identifier (GUID).

Storage elements 300 may be configured as redundant or operate independently of one another. In some configurations, if one particular storage element 300 fails its function can easily be taken on by another storage element 300 in the storage system. Furthermore, the independent operation of the storage elements 300 allows to use any suitable mix of types storage elements 300 to be used in a particular storage system 100. It is possible to use for example storage elements with differing storage capacity, storage elements of differing manufacturers, using different hardware technology such as for example conventional hard disks and solid-state storage elements, using different storage interfaces such as for example different revisions of SATA, SAS, FC, NVMe, and so on. All this results in specific advantages for scalability and flexibility of storage system 100 as it allows to add or remove storage elements 300 without imposing specific requirements to their design in correlation to other storage elements 300 already in use in that storage system 100.

Figure 4:
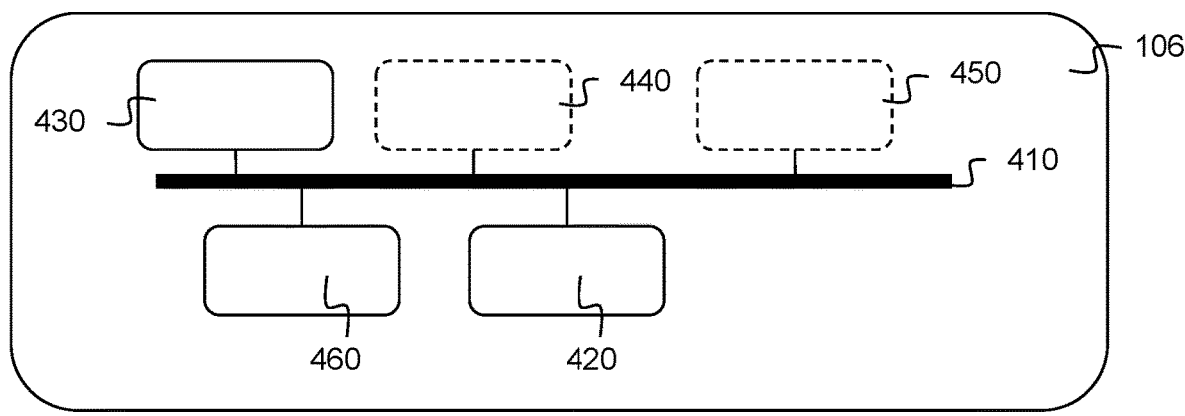
FIG. 4 schematically illustrates a host node of the storage system of FIG. 1.

FIG. 4 shows a schematic representation of the host nodes 106. Host node 106 may comprise a bus 410, a processor 420, a local memory 430, one or more optional input units 440, one or more optional output units 450, and a communication interface 460. Bus 410 may include one or more conductors that permit communication among the components of host node 106. Processor 420 may include any type of conventional processor or microprocessor that interprets and executes instructions. Local memory 430 may include a random access memory (RAM) or another type of dynamic storage device that stores information and instructions for execution by processor 420 and/or a read only memory (ROM) or another type of static storage device that stores static information and instructions for use by processor 420 and/or any suitable storage element such as a hard disc or a solid state storage element. An optional input unit 440 may include one or more conventional mechanisms that permit an operator to input information to said host node 106 such as a keyboard, a mouse, a pen, voice recognition and/or biometric mechanisms, etc. Optional output unit 450 may include one or more conventional mechanisms that output information to the operator, such as a display, a printer, a speaker, etc. Communication interface 460 may include any transceiver-like mechanism that enables host node 106 to communicate with other devices and/or systems, for example mechanisms for communicating with other storage nodes 120 or host nodes 106 such as for example two 10 Gb Ethernet interfaces.

Figure 5:
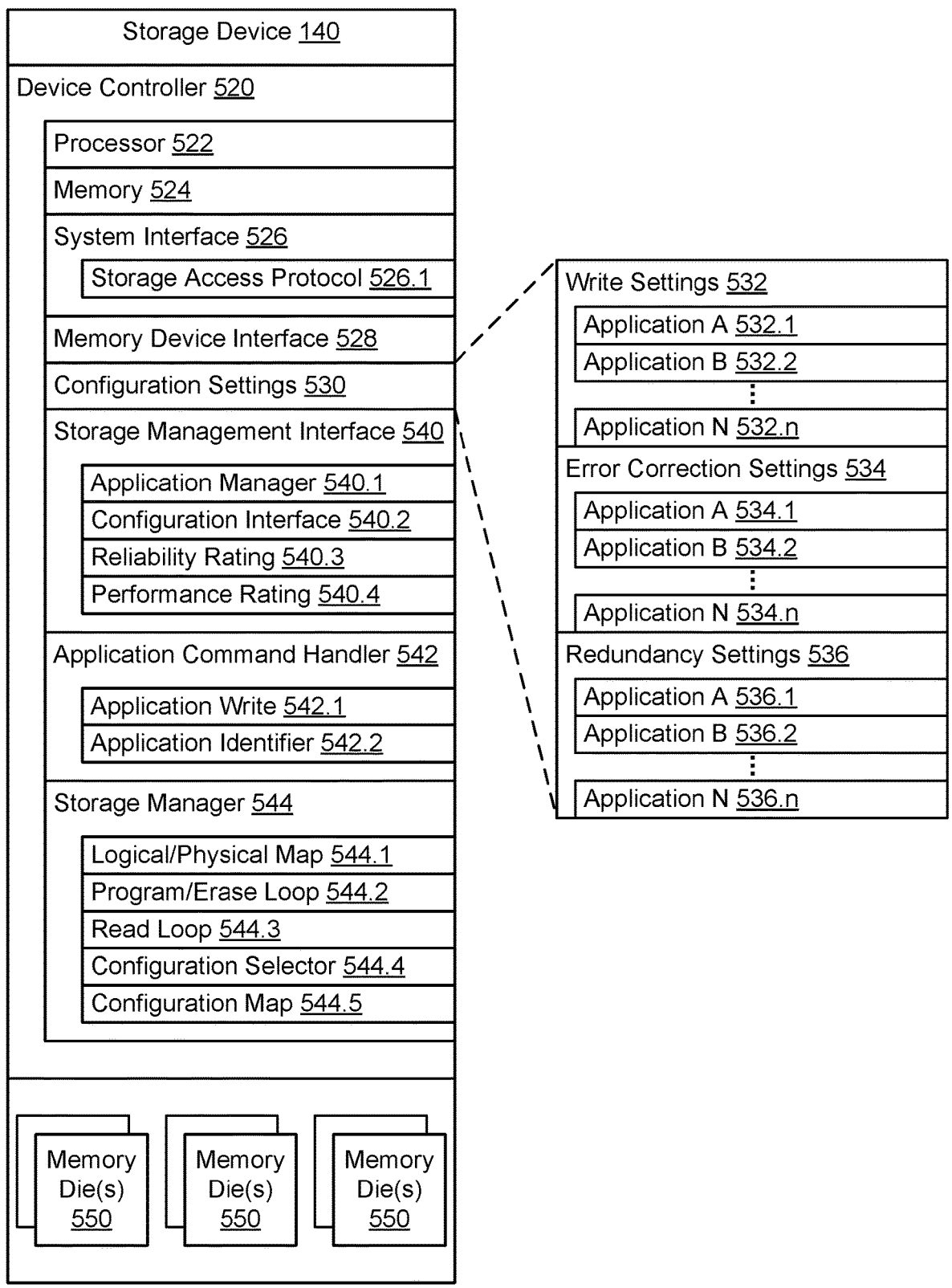
FIG. 5 schematically illustrates some elements of a storage device of FIGS. 1-4 in more detail.

FIG. 5 schematically shows selected modules of a storage device 140. Storage device 140 may support and/or be integrated into a storage system that may incorporate elements and configurations similar to those shown in FIGS. 1-4. For example, storage device 140 may be configured as storage devices 140 in FIG. 1 and/or storage elements 300 in FIG. 3. In addition to the modules shown, each storage device 140 may include its own bus, specialty processors or modules (RDMA engine, error correction code (ECC) engine, etc.), and other components supporting device controller 520. The modules or subsystems of device controller 520 may be instantiated in storage device memory 524 and executed by one or more storage device processors 522.

Processor 522 may include any type of processor or microprocessor that interprets and executes instructions. Memory 524 may include a random access memory (RAM) or another type of dynamic storage device that stores information and instructions for execution by processor 522 and/or a read only memory (ROM) or another type of static storage device that stores static information and instructions for use by processor 522 and/or any suitable storage element such as a hard disc or a solid state storage element. In some embodiments, processors 522 and memory 524 may include a plurality of distinct compute resources associated with storage device 140 and subcomponents thereof. Device controller 520 may include a plurality of modules or subsystems that are stored and/or instantiated in memory 524 for execution by processor 522.

In some embodiments, device controller 520 may be an onboard controller with related processor, memory, bus, physical interfaces, and other components for managing the operation of storage device 140. For example, device controller 520 may be an NVMe device controller with a PCIe interface to storage node 120 and may be configured for drive operations according to standard and proprietary protocols for reading and writing data on non-volatile memory dies 550. Device controller 520 may also support various storage device configuration and management operations for non-volatile memory dies 550, the data stored thereon, and the collective hardware and software functions of the components of storage device 140. In some embodiments, device controller 520 and NVM dies 550 may be packaged as a drive unit with a defined physical interface for communicating with other components of storage system 500.

Device controller 520 may include a plurality of functional modules instantiated in memory 524 for execution by processor 522 of storage device 140 and/or device controller 520. For example, device controller 520 may include a system interface 526 configured to interface with a host system, such as storage nodes 120 and/or hosts 106, for receiving and returning application data and storage management commands. Device controller 520 may include a memory device interface 528 for connecting to memory devices, such as memory dies 550. Device controller 520 may include configuration settings 530 configured to store application sets of storage device configuration settings. Device controller 520 may include a storage management interface 540 configured to expose storage device data and management functions for storage device 140 to one or more storage management systems, such as storage controller 130 and/or hosts 106. Device controller 520 may include an application command handler 542 configured to receive and parse storage commands that include or invoke application-based storage device configuration settings. Device controller 520 may include a storage manager 544 configured to manage the processing of read, write, and other data storage commands to memory devices in the storage device, such as memory dies 550.

System interface 526 may include a set of interfaces, functions, parameters, and/or data structures for enabling a physical, transport, and logical connection from storage device 140 to at least one host system configured to access the data and management functions of storage device 140. For example, system interface 526 may support a storage access protocol 526.1, such as NVMe, for sending and receiving storage commands and related data to or through a storage controller for use by a host system. In some embodiments, device controller 520 may be an NVMe device controller and system interface 526 may use a PCIe interface to storage node 120 and run NVMe compliant firmware or software for managing and providing access to the storage subsystems of storage device 140. In some embodiments, system interface 526 may include a SATA, SAS, or other standard compliant interface. System interface 526 may support one or more command sets and defined protocols, formats, and parameters for input/output operations between storage device 140 and other systems.

Memory device interface 528 may include a physical interface and corresponding protocols for communication between device controller 520 and one or more NVM media devices including memory dies 550. For example, memory device interface 528 may include a flash bus interface for providing multi-channel communication with the NVM media devices in storage device 140.

Configuration settings 530 may include a set of interfaces, functions, parameters, and/or data structures for storing a plurality of storage device configuration settings, at least one of which may be associated with an application set of configuration settings that is different than the default settings the storage device was initially configured with. For example, configuration settings 530 may include a configuration file, configuration table, or similar data structure populated with various configuration setting types and corresponding parameter values for one or more application sets.

In some embodiments, a plurality of configuration setting types may be managed in configuration settings 530. For example, configuration setting types may include write settings 532, error correction settings 534, redundancy settings 536. In some embodiments, each configuration setting type may itself include a plurality of configuration setting parameters corresponding to different parameters that drive reliability and performance for that particular configuration setting type. For example, write settings 532 may include a plurality of parameters related to the electrical signals used to write a bit, line, or page to the cells in memory dies 550. In some embodiments, one or more trim parameters, such as write signal timing, pulse counts, pulse widths, applied voltage levels, etc. may be among write settings 532. Error correction settings 534 may include a plurality of parameters related to error correction codes used for encoding and decoding data written to memory dies 550. Error correction settings 534 may include encoding algorithms, parity levels, block size, etc. Redundancy settings 536 may include at least one parameter representing a mirroring scheme for pages or blocks within memory dies 550. For example, redundancy settings 536 may include a single copy, mirroring within a memory die, in various configurations across memory dies, any number of multiple copies, etc.

In some embodiments, storage device configuration settings may be organized in sets to allow the storage device or a host system to change one or more parameters at runtime to respond to specific host data and application considerations. For example, alternate values for one or more parameters in write settings 532, error correction settings 534, and/or redundancy settings 536 may be stored in configuration settings 530. In some embodiments, the different values may be assigned to application sets that change one or more parameters for a particular client application and enable application aware configuration settings. For example, a first application may be designated as application A and correspond to application write settings 532.1, application error correction settings 534.1, and application redundancy settings 536.1. A second application may be designated as application B and correspond to application write settings 532.2, application error correction settings 534.2, and application redundancy settings 546.2. Configuration settings 530 may support any number of application sets of storage device configuration settings. In some embodiments, at least one application set may correspond to the default or manufacturers settings for storage device 140 and each additional application set may change at least one parameter to support application performance and reliability trade-offs.

Storage management interface 540 may include a set of interfaces, functions, parameters, and/or data structures for exposing storage device configuration parameters, operating parameters, and other device management data to a storage management service or directly to a host system. For example, storage management interface 540 may provide an application programming interface (API) for allowing a host system to access and manage the application sets of configuration settings in configuration settings 530. In some embodiments, storage management interface 540 may include an application manager 540.1 that may be configured to enable the definition and storage of application sets of configuration settings. For example, application manager may enable a user to define application sets in a data structure in configuration settings 530 and index them through an application type or application identifier for access and use at runtime. In some embodiments, application manager 540.1 may enable the upload of configuration settings 530 into an appropriate storage location in storage device 140 or provide a command line or similar interface for manipulating configuration settings 530 in storage device 140.

In some embodiments, storage management interface 540 may include a configuration interface 540.2 that provides or supports a graphical user interface for defining the application sets of configuration settings from the host system or another storage management tool. For example, configuration interface 540.2 may enable a user to receive and navigate the default configuration settings 530 and related parameter values. Configuration interface 540.2 may provide or support an editor for modifying parameters and storing them as different application sets. For example, configuration interface 540.2 may expose the write trim parameters for storage device 140 to the host system and allow a user to change the write trim values and store them in one or more application sets for use by storage device 140 in response to specific storage commands related to the application. In some embodiments, configuration interface 540.2 may further enable the user to provide application types or identifiers, and/or assign specific application identifiers to configuration sets and specific storage locations, such as defined dies, blocks, or groups of blocks, to support particular application data with an application-based set of storage device configuration settings.

In some embodiments, storage management interface 540 may be configured to determine or model reliability rating 540.3 and/or performance rating 540.4 in response to different configurations of storage device configuration settings. For example, when a parameter is changed for a new application set, storage management interface 540 may calculate a reliability rating 540.3, such as a projected bit error rate (BER), program loop count (PLC) values, or likelihood of soft bit or hard bit decoding, and performance rating 540.4, such as projected input/output operations per unit of time (TOPS) or other performance benchmarks. Storage management interface 540 may enable a user to understand the reliability and performance trade-offs when customizing configuration settings 530 for specific application needs that may not be supported by the default configuration settings for storage device 140.

Application command handler 542 may include a set of interfaces, functions, parameters, and/or data structures for receiving storage commands from the host system and identifying them as requiring a selected application set of configuration parameters. For example, an application write command 542.1 may include an application identifier 542.2 as a parameter to the storage command. In some embodiments, application command handler 542 may be configured to return application identifier 542.2 to storage manager 544 for selecting the application set of configuration settings for executing the storage command.

Application write command 542.1 may operate in other respects like other write commands, but may include a predefined parameter that invokes application command handler 542 to select an application set of configuration settings for executing the write command. In some embodiments, the parameter may include an application identifier that application command handler 542 may use as an index value for selecting one or more application-specific settings from configuration settings 530. In some embodiments, the parameter may include the application setting value itself. For example, application write command 542.1 may enable one or more parameters that include a configuration setting identifier and a configuration setting value to be used for executing the write command. Application command handler 542 may parse the changed application settings and corresponding values from application write command 542.1 and use them for the storage operation. In some embodiments, the changed application settings and corresponding values may also be saved to configuration settings 530 and given an application type or application identifier 542.2 for later use. In some embodiments, application command handler 542 may support other command types, such as read, delete, and other storage commands, with application-specific configuration settings invoked through one or more command parameters.

In some embodiments, application identifier 542.2 may include a unique identifier for a specific host application and both the host system and storage device 140 may use the unique identifiers for each host application to select the correct configuration settings 530 at runtime. For example, application manager 540.1 and/or configuration interface 540.2 may be used to configure a list of unique application identifiers 542.2 and associate each one with a corresponding application set of configuration settings in configuration settings 530. In some embodiments, application identifier 542.2 may directly or indirectly correspond to an application type, where all applications of that application type use the same application set of configuration settings. For example, all video applications may use application set B and all financial applications may use application set N. In some embodiments, application set A may be the default storage device settings and may be the default for storage commands that do not indicate an application identifier 542.2.

In some embodiments, configuration settings 530 may be associated with storage locations, such as specific dies, blocks, or groups of blocks (zones), such that by targeting a data unit within one of those locations, the selected configuration settings for that application are used. For example, storage manager 544 may include a configuration map 544.5 to look up the correct application set of configuration settings for processing a storage command to a target location. In such a configuration, no special parameters may be used in the storage commands and application command handler 542 may operate no differently than other command handlers, instead relying on storage manager 544 for selection of application sets among configuration settings 530.

Storage manager 544 may include a set of interfaces, functions, parameters, and/or data structures for managing read and write operations to the storage media of storage device 140, such as NVM dies 550. For example, storage manager 544 may handle read, write, delete, and other storage operations to logical or physical storage locations within storage device 140. In some embodiments, storage manager 544 may include a logical/physical map 544.1 that provides logical/physical indirection and mapping for enabling storage manager 544 to manage physical storage locations independent of the logical storage locations specified by write commands from the host system or another storage controller. For example, logical/physical map 544.1 may include a flash translation layer (FTL) for associating logical block addresses with physical storage locations in the storage media. In some embodiments, the storage locations used by the host system may correspond to one or more LBAs maintained in logical/physical map 530.1 and the LBAs may correspond, through logical/physical map 530.1, to one or more storage units in the physical storage structure of the NVM media of storage device 140.

Storage manager 544 may be configured for handling various storage commands, such as read, write, and delete commands, and command parameters related to those commands. In some embodiments, those command parameters may be received from application command handler 542 and may include application identifiers 542.2. Storage manager 544 may include logic for executing program/erase loop 544.2 for write, delete, and similar operations to modify the bits of data stored in memory dies 550 and read loop 544.3 for reading data from memory dies 550. In some embodiments, program/erase loop 544.2 may use a plurality of write parameters for determining the pattern of electrical signals used to write the desired data bits into the physical cells of memory dies 550. For example, program/erase loop 544.2 may include write trim parameters defining the timing, shape, magnitude, and other features of the write signal, as well as parameters related to acceptable thresholds for verifying writes, loop count parameters for allowing multiple attempts, and other write parameters. Read loop 544.3 may include similar configuration parameters. One or more parameters for writing and/or reading data based on the electrical signals too or from the physical cells of memory dies 550 may be included in configuration settings 530 and varied in application sets of configuration settings in order to adjust the performance and reliability for a particular application.

In some embodiments, storage manager 544 may include a configuration selector 544.4 configured to select a particular application set of configuration parameters for the storage command being processed. For example, based on an application identifier and/or storage location associated with the storage command, configuration selector may select an application set corresponding to the application from which the application data originated. In some embodiments, the application identifier or a similar index key for locating the correct application set of configuration settings may be parsed from the storage command and provided to storage manager 544, such as by application command handler 542.

In some embodiments, storage manager 544 may include configuration map 544.5 to use storage location to index the application set of configuration settings. For example, configuration map 544.5 may include a table or similar data structure that assigns sets of blocks, dies, or other storage locations to particular applications and corresponding sets of configuration settings. In some embodiments, storage management interface 540 may enable the host system or a user thereof to assign various storage locations in memory dies 550 to correspond to selected applications and then use those assignments when generating storage commands for each application. In some embodiments, configuration map 544.5 may be configured as a storage location-based index to configuration settings 530.

Device controller 520 and/or storage device 140 may include additional logic and other resources (not shown) for processing storage commands and storage management requests, such as modules for generating, queueing, and otherwise managing storage, management, and rebuild requests.

Figure 6:
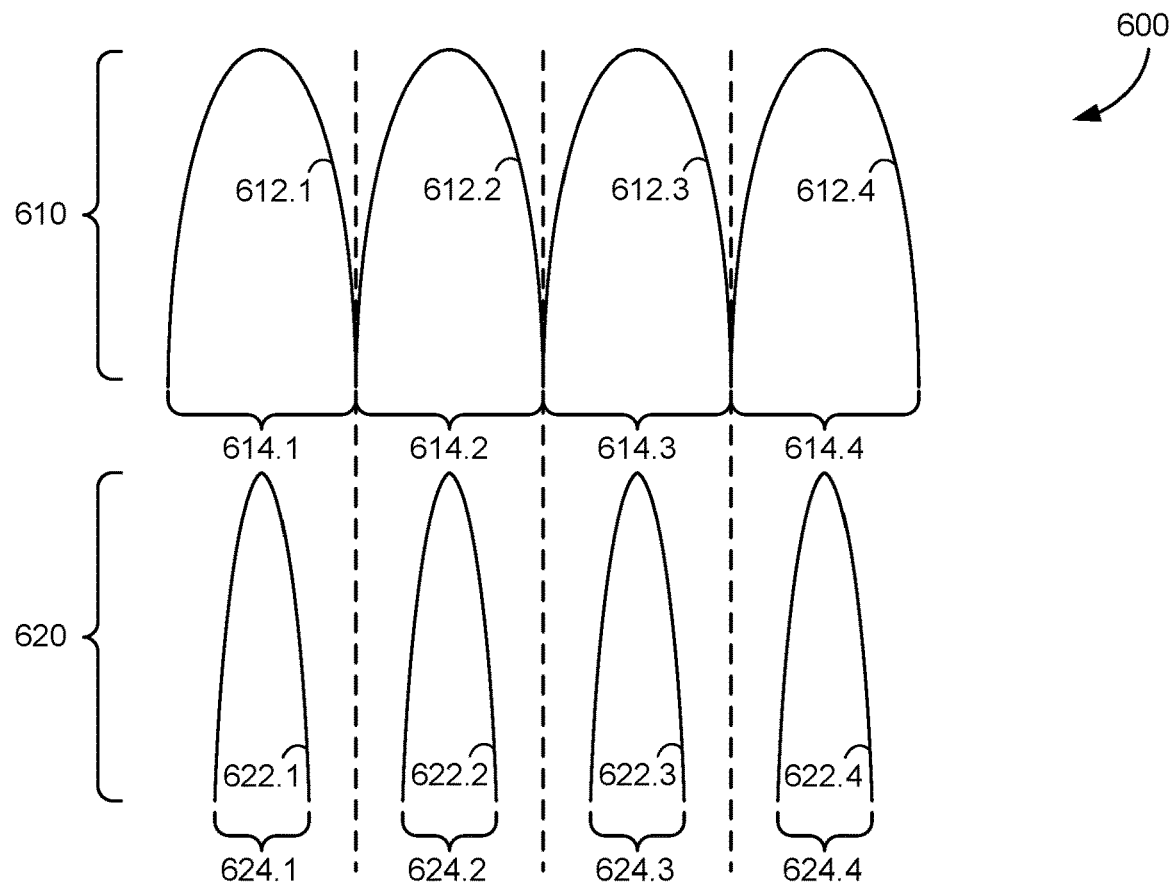
FIG. 6 schematically illustrates varying trim settings for application-based write commands.

FIG. 6 shows write profiles 600 for four consecutive bits according to two configurations 610, 620. In write signals, there is an inverse correlation between performance and reliability. By writing slowly, the read performance and reliability are increased, but the performance (in terms of number of operations per unit time) are decreased. By changing the trim settings for the write signal, the storage device can vary and adjust this tradeoff for different applications. For example, configuration settings for writing slowly (for applications that do not need fast write performance) may allow cells to be programmed as fast as needed for the application, while increasing reliability.

Write profile 612 in configuration 610 includes four bits 612.1-612.4 programmed in non-volatile memory cells. Write profile 612 may include a profile width based on trim parameters that determine the write speed and/or signal timing for write profile 612. For example, profile widths 614.1-614.4 in configuration 610 may result in high write performance, low read performance, and a higher bit error rate. Configuration 610 may correlate to a first reliability value for the configuration set of storage device configuration settings that generate write profile 612.

Write profile 622 in configuration 620 includes four bits 622.1-622.4 programmed in non-volatile memory cells. Write profile 622 may include a narrower profile width based on trim parameters that determine the write speed and/or signal timing for write profile 622. For example, profile widths 624.1-624.4 in configuration 620 may result in lower write performance, higher read performance, and a lower bit error rate compared to configuration 610. Configuration 620 may correlate to a second reliability value for a different configuration set of storage device configuration settings that generate write profile 622.

Figure 7:
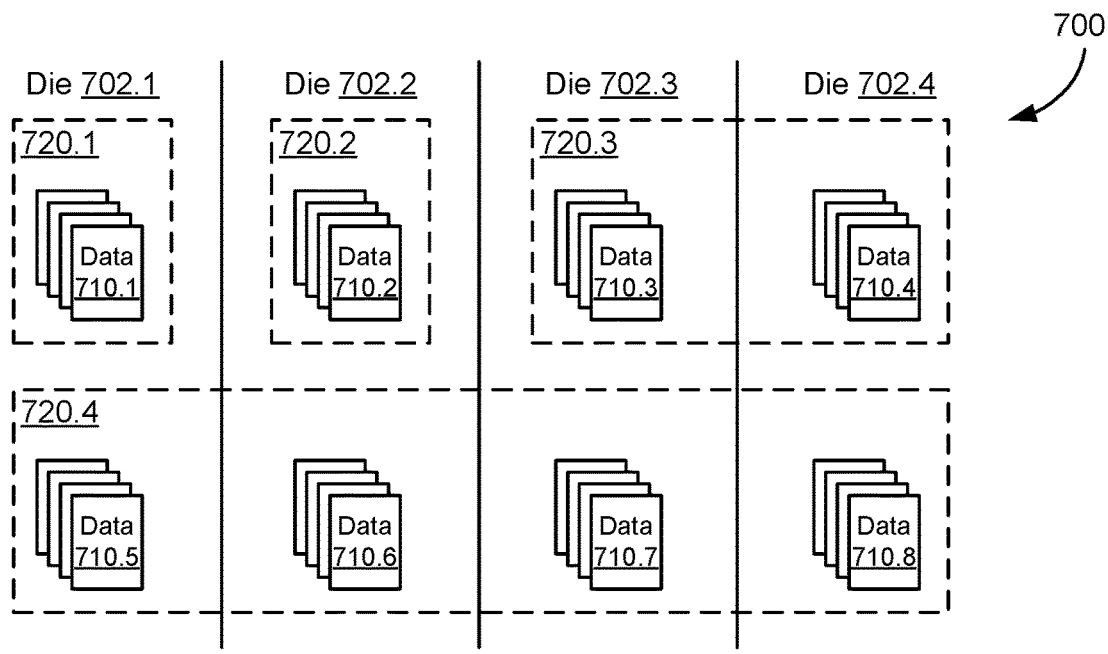
FIG. 7 schematically illustrates a plurality of configuration settings across memory dies in a storage device.

FIG. 7 shows data 710 stored according to a plurality of configuration settings 720 in a storage medium 700, such as the non-volatile memory dies of storage device 140. A plurality of memory dies 702.1-702.4 store various blocks of data 710, grouped by the application sets of storage device configuration settings 720 used to store them. For example, data blocks 710.1 are stored on die 702.1 according to configuration settings 720.1 and data blocks 710.2 are stored on die 702.2 according to configuration settings 720.2, where the configuration settings 720.1 are different than the configuration settings 720.2. Data blocks 710.3 are stored on die 702.3 and data blocks 710.4 are stored on die 702.4 with the same configuration settings 720.3, but different than configuration settings 720.1 or 720.2. Data blocks 720.5-710.8 are stored across dies 702.1-702.4 with configuration settings 720.4. In the configuration show, each die 702.1-702.4 includes two different configuration settings for the data 710 stored thereon.

In some embodiments, configuration settings 720 may be mapped to the storage locations on dies 702, such as by block or zone, and associated with a specific application or application type. For example, blocks 710.1 with configuration settings 720.1 may correspond to a first host application, blocks 710.2 with configuration settings 720.2 may correspond to a second host application, blocks 710.3-710.4 with configuration settings 720.3 may correspond to a third host application. And block 710.5-710.8 with configuration settings 720.4 may correspond to a fourth host application. In some embodiments, storage medium 700 may be configured with reliability groups that correspond to a source application. For example, the data blocks with configuration settings 720.4 may belong to the same source application and reliability group. In some embodiments, a reliability group may include multiple dies and/or multiple sets of configuration settings selected to achieve a desired reliability, redundancy, and/or performance.

Figure 8:
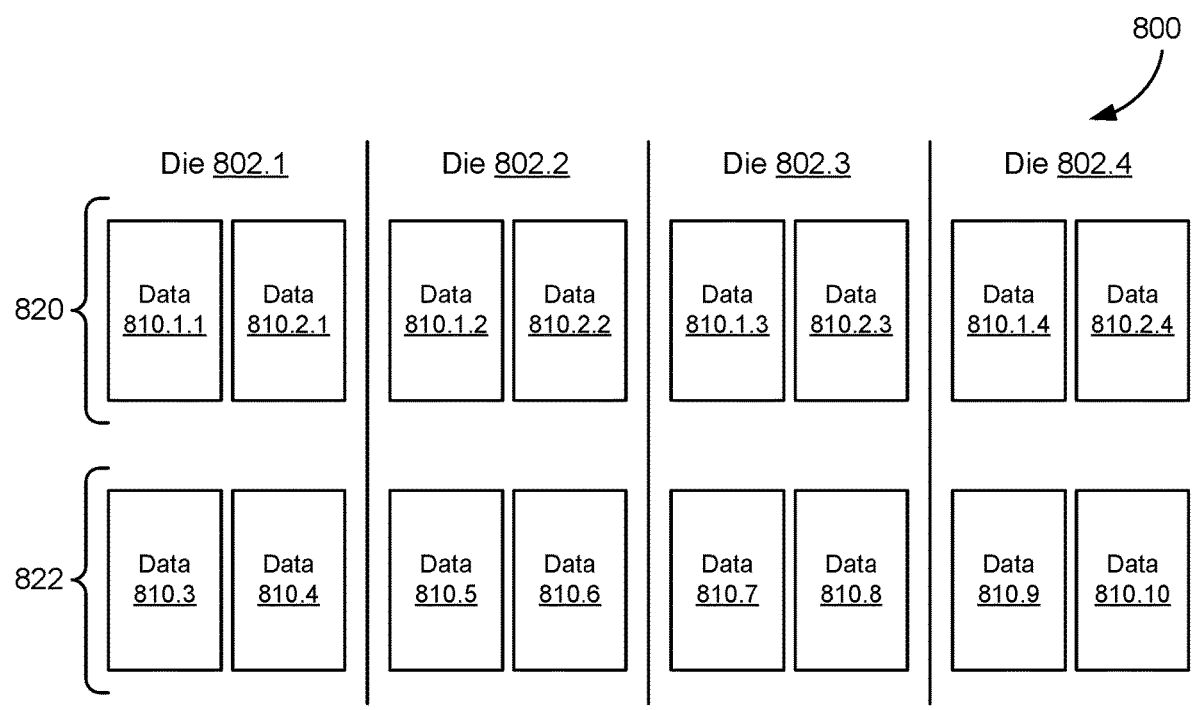
FIG. 8 schematically illustrates different data replication settings across memory dies in a storage device.

FIG. 8 shows data 810 stored according to two different configuration settings 820, 822 in a storage medium 800, such as the non-volatile memory dies of storage device 140. In some embodiments, a storage device may be configured to include internal replication of data blocks across internal storage locations to improve reliability, while decreasing both capacity and write performance. Configuration settings 820 and 822 may include different replication settings. For example, configuration setting 820 may replicate the same data across each die 802.1-802.4, resulting in four copies of data 810.2 and 810.2. This high redundancy may correspond to high reliability and read performance, but lower write performance for a target application. Configuration setting 822 may not replicate the data at all, so each die 801.1-802.4 includes a single copy of different data blocks 810.3-810.10. This low (no) redundancy configuration may correspond to lower reliability and read performance, but higher write performance for a second target application.

Figure 9:
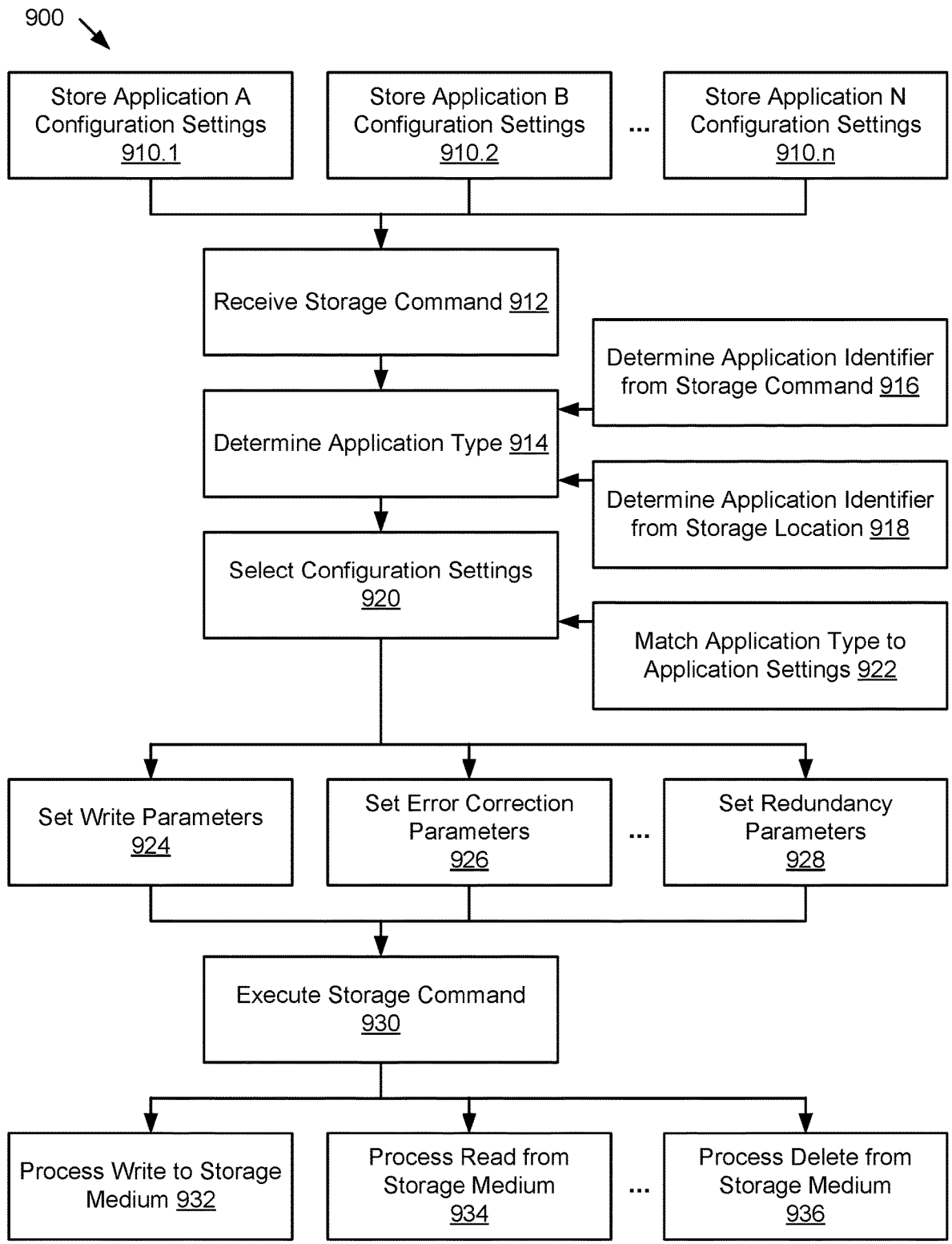
FIG. 9 is a flowchart of an example method of processing storage commands with different application configuration settings.

As shown in FIG. 9, storage device 140 may be operated according to an example method of executing storage commands using application-based configuration settings, i.e. according to method 900 illustrated by blocks 910-736 in FIG. 9.

At blocks 910, a plurality of configuration settings for different applications may be stored. For example, a device controller in a storage device may be configured to store configuration settings for different applications, such as application A at block 810.1, application B at block 910.2, and application N at block 910.n, in a configuration file, page, or table.

At block 912, a storage command may be received. For example, the device controller may receive a storage command from a host system indicating that the storage command should be processed according to a corresponding application set of configuration settings.

At block 914, an application type may be determined. For example, the device controller may determine that the storage command corresponds to one of the applications with configuration settings stored at block 910. In some embodiments, an application identifier may be determined from the storage command at block 916, such as using an application identifier parameter in the storage command. In some embodiments, an application identifier may be determined from the storage location targeted by the storage command at block 918, such as using a configuration map stored in the storage device for associating storage locations with application sets of configuration settings.

At block 920, configuration settings may be selected based on the application type. For example, using the application type to directly or indirectly index the application sets of configuration settings, the device controller may select the configuration settings to use for the storage command.

At block 924, write parameters may be set for the storage operation. For example, the device controller may select one or more changed parameter values and/or a complete set of write parameter values, including trim parameter settings, from the application set of configuration values selected at block 920.

At block 926, error correction parameters may be set for the storage operation. For example, the device controller may select one or more changed parameter values and/or a complete set of error correction parameter settings from the application set of configuration values selected at block 920 for the error correction algorithms to be used for the storage command.

At block 928, redundancy parameters may be set for the storage operation. For example, the device controller may select one or more changed parameter values and/or a complete set of redundancy parameter settings from the application set of configuration values selected at block 920.

At block 930, the storage command may be executed to the storage medium of the storage device. For example, the device controller may process the storage operation or operations in the storage command using the selected configuration settings and targeting one or more data units in the storage medium. For example, the device controller may process a write command to the storage medium at block 932, process a read command from the storage medium at block 934, or process a delete operation to the storage medium at block 936.

Figure 10:
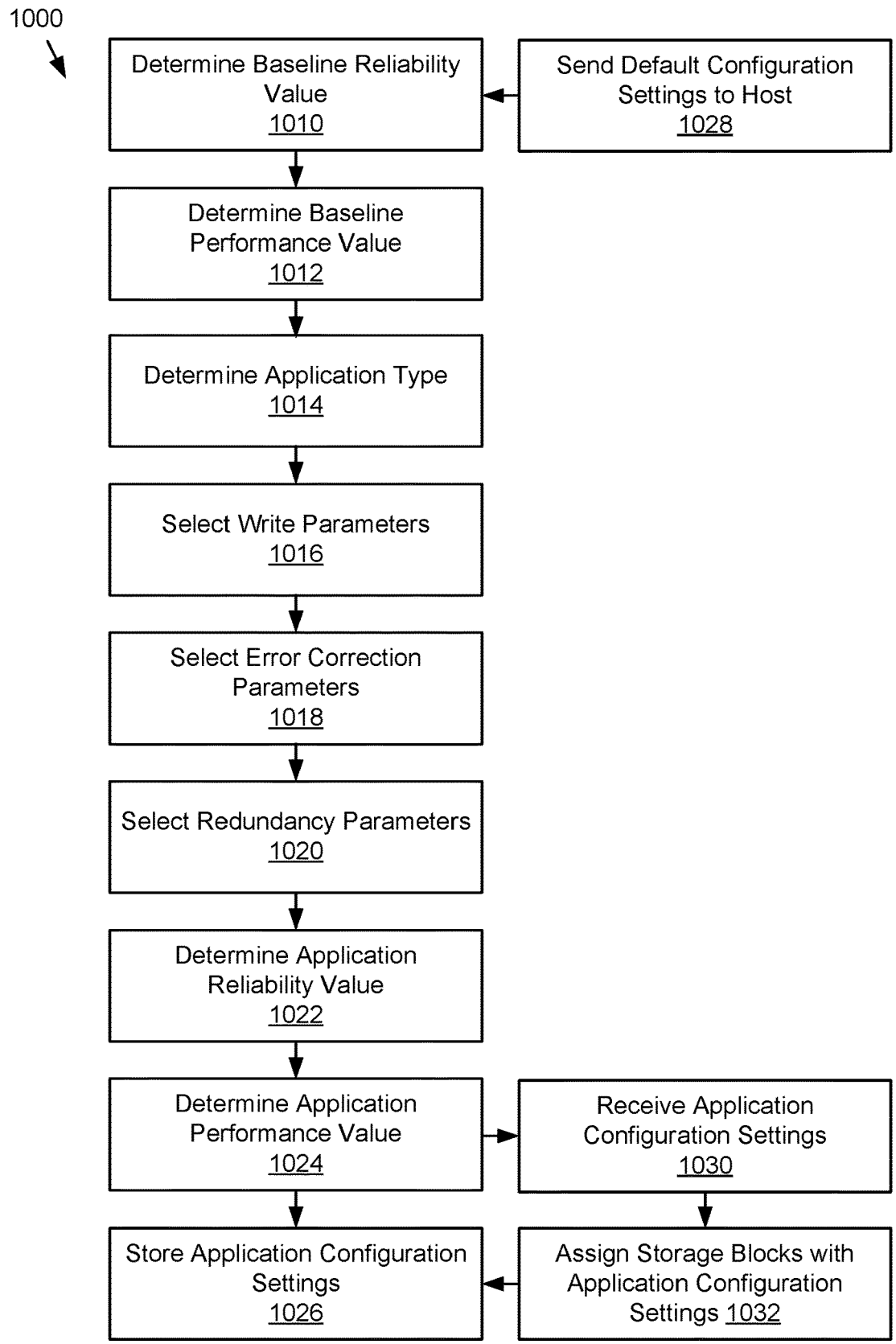
FIG. 10 is a flowchart of an example method of generating different storage device configuration settings.

As shown in FIG. 10, storage system 100 may be operated according to an example method of configuring application sets of configuration settings for storage devices 140, i.e. according to method 1000 illustrated by blocks 1010-1032 in FIG. 10. In some embodiments, method 1000 may be executed by the storage device or a utility available to the host system for configuring the storage device.

At block 1010, a baseline reliability value may be determined. For example, a storage management interface may determine a baseline reliability value, such as mean bit error rate, for default configuration settings for a storage device.

At block 1012, a baseline performance value may be determined. For example, the storage management interface may determine a baseline performance value, such as maximum input/output operations per unit time.

At block 1014, an application type may be determined. For example, the storage management interface may enable a user to define any number of host applications or application types indexing a corresponding set of configuration settings with an associated application identifier.

At block 1016, write parameters may be selected for the application set. For example, the storage management interface may enable the user to view and modify the default write parameters to select write parameters for the application set.

At block 1018, error correction parameters may be selected for the application set. For example, the storage management interface may enable the user to view and modify the default error correction parameters to select error correction parameters for the application set.

At block 1020, redundancy parameters may be selected for the application set. For example, the storage management interface may enable the user to view and modify the default redundancy parameters to select redundancy parameters for the application set.

At block 1022, a reliability value for the application set may be determined. For example, the storage management interface may determine a reliability value, such as mean bit error rate, based on the new configuration settings in the application set.

At block 1024, a performance value for the application set may be determined. For example, the storage management interface may determine a performance value, such as maximum input/output operations per unit time, based on the new configuration settings in the application set. The reliability and performance values for the new configuration settings may be compared to the baseline reliability and performance values and/or the reliability and performance values of other application sets of configuration settings to assist in selecting and assigning configuration settings to applications or application types.

At block 1026, the application configuration settings may be stored. For example, the storage management interface may store the application sets of configuration settings and corresponding application types or identifiers to configuration settings in the storage device.

In some embodiments, one or more blocks 1010-1026 may be executed by a storage management utility on the host system or another storage management system for the storage device. The storage device may be configured to send and receive the configuration settings to the host system or other system to support such configuration.

At block 1028, the default configuration settings may be sent to the host. For example, the storage management interface may send or otherwise expose the default configuration settings, such as write settings, error correction settings, and/or redundancy settings, to the host for use in the storage management utility.

At block 1030, the application configuration settings may be received by the storage device. For example, the storage management interface may receive the application set of configuration settings for use by the storage device.

At block 1032, storage blocks may be assigned to the application configuration settings. For example, a storage manager may include an application map for assigning storage blocks or other groups of storage locations to selected application sets of configuration settings.

While at least one exemplary embodiment has been presented in the foregoing detailed description of the technology, it should be appreciated that a vast number of variations may exist. It should also be appreciated that an exemplary embodiment or exemplary embodiments are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

As will be appreciated by one of ordinary skill in the art, various aspects of the present technology may be embodied as a system, method, or computer program product. Accordingly, some aspects of the present technology may take the form of an entirely hardware embodiment, an entirely software embodiment (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, random access memory (RAM), read-only memory (ROM), an erasable programmable read-only memory (EPROM), an electrically erasable programmable read-only memory (EEPROM), a Flash memory, an optical fiber, a compact disk read-only memory (CD-ROM), an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the C programming language or other similar programming language. The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g., through the Internet using an Internet Service Provider).

Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, can be implemented by computer program instructions. These computer program instructions may be provided to a processing device (processor) of a general purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram. Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

The invention claimed is:

1. A storage device, comprising:
   a storage medium; and
   a device controller coupled to the storage medium and configured to:
      configure a first set of storage blocks in the storage medium with a first application set of configuration settings;
      configure a second set of storage blocks in the storage medium with a second application set of configuration settings;
      receive a storage command for a target data unit;
      select, based on a storage location in the storage command, a set of configuration settings selected from:
         the first application set of configuration settings; and
         the second application set of configuration settings, wherein:
            the first application set of configuration settings includes a first trim parameter setting for electrical signals used to write data units to the storage medium;

the second application set of configuration settings
   includes a second trim parameter setting for
   electrical signals used to write data units to the
   storage medium;
the first trim parameter setting is different from the
   second trim parameter setting; and
the storage location is selected from:
   the first set of storage blocks; and
   the second set of storage blocks; and
execute, using the selected set of configuration settings, the storage command to the storage medium.

2. The storage device of claim 1, wherein:
the device controller is further configured to:
   store the first application set of configuration settings, wherein the first application set of configuration settings corresponds to a first application type;
   store the second application set of configuration settings, wherein the second application set of configuration settings corresponds to a second application type; and
   determine an application type for the storage command;
selecting the first application set of configuration settings for the selected set of configuration settings is based on the application type for the storage command matching the first application type; and
selecting the second application set of configuration settings for the selected set of configuration settings is based on the application type for the storage command matching the second application type.

3. The storage device of claim 2, wherein:
determining the application type for the storage command includes determining an application identifier in the storage command; and
determining the application type for the storage command is based on the application identifier.

4. The storage device of claim 1, wherein:
the device controller is further configured to:
   send the first application set of configuration settings to a host system; and
   receive the second application set of configuration settings from the host system; and
the first application set of configuration settings are a default set of configuration settings.

5. The storage device of claim 1, wherein:
the first application set of configuration settings further includes:
   a first error correction parameter setting; and
   a first redundancy parameter setting;
the second application set of configuration settings further includes:
   a second error correction parameter setting; and
   a second redundancy parameter setting;
the first error correction parameter setting is different from the second error correction parameter setting; and
the first redundancy parameter setting is different from the second redundancy parameter setting.

6. The storage device of claim 1, wherein:
the set of configuration settings includes at least one error correction parameter setting for error correction algorithms used to write the target data unit to the storage medium;
the storage command includes a write command for the target data unit;
the first application set of configuration settings further includes a first error correction parameter setting;
the second application set of configuration settings further includes a second error correction parameter setting; and
the first error correction parameter setting is different from the second error correction parameter setting.

7. The storage device of claim 1, wherein:
the set of configuration settings includes at least one redundancy parameter setting for determining a number of copies of the target data unit to write to the storage medium;
the storage command includes a write command for the target data unit;
the first application set of configuration settings further includes a first redundancy parameter setting;
the second application set of configuration settings further includes a second redundancy parameter setting; and
the first redundancy parameter setting is different from the second redundancy parameter setting.

8. The storage device of claim 1, wherein:
the first application set of configuration settings corresponds to a baseline reliability value for data units stored to the storage medium; and
the second application set of configuration settings corresponds to a higher reliability value for data units stored to the storage medium.

9. The storage device of claim 1, wherein:
the first application set of configuration settings corresponds to a baseline performance value for data units stored to the storage medium; and
the second application set of configuration settings corresponds to a higher performance value for data units stored to the storage medium.

10. The storage device of claim 1, wherein:
the storage medium is configured to include:
   a first set of storage blocks configured using the first application set of configuration settings; and
   a second set of storage blocks configured using the second application set of configuration settings;
the device controller is further configured to determine a reliability group for a plurality of data blocks corresponding to a source application; and
the reliability group includes storage locations in the first set of storage blocks and the second set of storage blocks.

11. A computer-based method, comprising:
storing a first application set of configuration settings, wherein the first application set of configuration settings includes a first trim parameter setting for electrical signals used to write data units to a storage medium;
storing a second application set of configuration settings, wherein:
   the second application set of configuration settings includes a second trim parameter setting for electrical signals used to write data units to the storage medium; and
   the first trim parameter setting is different from the second trim parameter setting;
receiving, at a storage device, a storage command for a target data unit;
determining an application type for the storage command, wherein:
   the first application set of configuration settings corresponds to a first application type; and
   the second application set of configuration settings corresponds to a second application type;
selecting, based on the application type for the storage command, a set of configuration settings selected from:

the first application set of configuration settings responsive to the application type for the storage command matching the first application type; and the second application set of configuration settings responsive to the application type for the storage command matching the second application type; and executing, using the selected set of configuration settings, the storage command to the storage medium of the storage device.

12. The computer-based method of claim 11, further comprising:

determining a reliability group for a plurality of data blocks corresponding to a source application, wherein:
the storage medium is configured to include:
a first set of storage blocks configured using the first application set of configuration settings; and
a second set of storage blocks configured using the second application set of configuration settings; and
the reliability group includes storage locations in the first set of storage blocks and the second set of storage blocks.

13. The computer-based method of claim 11, wherein:

determining the application type for the storage command includes determining an application identifier in the storage command; and
determining the application type for the storage command is based on the application identifier.

14. The computer-based method of claim 11, further comprising:

sending the first application set of configuration settings to a host system, wherein the first application set of configuration settings are a default set of configuration settings; and
receiving the second application set of configuration settings from the host system.

15. The computer-based method of claim 11, further comprising:

configuring a first set of storage blocks in the storage medium with the first application set of configuration settings;
configuring a second set of storage blocks in the storage medium with the second application set of configuration settings; and
using a storage location in the storage command to select the selected set of configuration settings, wherein the storage location is selected from:
the first set of storage blocks; and
the second set of storage blocks.

16. The computer-based method of claim 11, wherein:

the set of configuration settings includes at least one error correction parameter setting for error correction algorithms used to write the target data unit to the storage medium;
the storage command includes a write command for the target data unit;
the first application set of configuration settings further includes a first error correction parameter setting;
the second application set of configuration settings further includes a second error correction parameter setting; and the first error correction parameter setting is different from the second error correction parameter setting.

17. The computer-based method of claim 11, wherein:

the set of configuration settings includes at least one redundancy parameter setting for determining a number of copies of the target data unit to write to the storage medium;
the storage command includes a write command for the target data unit;
the first application set of configuration settings further includes a first redundancy parameter setting;
the second application set of configuration settings further includes a second redundancy parameter setting; and
the first redundancy parameter setting is different from the second redundancy parameter setting.

18. The computer-based method of claim 11, wherein:

the first application set of configuration settings corresponds to a baseline reliability value for data units stored to the storage medium; and
the second application set of configuration settings corresponds to a higher reliability value for data units stored to the storage medium.

19. The computer-based method of claim 11, wherein:

the first application set of configuration settings corresponds to a baseline performance value for data units stored to the storage medium; and
the second application set of configuration settings corresponds to a higher performance value for data units stored to the storage medium.

20. A system, comprising:

a storage device including:
a storage medium; and
a device controller coupled to the storage medium;
means for storing a first application set of configuration settings, wherein the first application set of configuration settings:
includes a first trim parameter setting for electrical signals used to write data units to the storage medium; and
corresponds to a baseline performance value for data units stored to the storage medium;
means for storing a second application set of configuration settings, wherein:
the second application set of configuration settings:
includes a second trim parameter setting for electrical signals used to write data units to the storage medium; and
corresponds to a higher performance value for data units stored to the storage medium; and
the first trim parameter setting is different from the second trim parameter setting;
means for receiving, at the storage device, a storage command for a target data unit;
means for selecting, based on an application type for the storage command, a set of configuration settings selected from:
the first application set of configuration settings; and
the second application set of configuration settings; and
means for executing, using the selected set of configuration settings, the storage command to the storage medium of the storage device.

* * * * *